(12) United States Patent  (10) Patent No.: US 6,669,264 B1
Tucker  (45) Date of Patent: Dec. 30, 2003

(54) FASTENERS FOR TRUCK BED COVERS

(75) Inventor: W. David Tucker, Palatine, IL (US)

(73) Assignee: Design Automotive Group, Inc., Lincolnshire, IL (US)

( * ) Notice: Subject to any disclaimer, the term of this patent is extended or adjusted under 35 U.S.C. 154(b) by 0 days.

(21) Appl. No.: 09/957,768

(22) Filed: Sep. 21, 2001

Related U.S. Application Data

(62) Division of application No. 09/181,792, filed on Oct. 28, 1998, now abandoned.

(51) Int. Cl.[7] .................................................. B60P 7/04
(52) U.S. Cl. ......................... 296/100.15; 296/100.16; 296/100.17
(58) Field of Search ........................ 296/100.15, 100.16, 296/100.18, 100.17; 160/368.1, 371, 327, 394, 397

(56) References Cited

U.S. PATENT DOCUMENTS

| | | | | |
|---|---|---|---|---|
| 2,937,652 A | * | 5/1960 | Zimmer, Jr. et al. ........ | 135/124 |
| 4,730,866 A | * | 3/1988 | Nett ...................... | 296/100.18 |
| 5,152,574 A | * | 10/1992 | Tucker ................... | 296/100.18 |
| 5,203,055 A | * | 4/1993 | Broadwater, Sr. ....... | 296/100.15 |
| 5,261,719 A | * | 11/1993 | Tucker ................... | 296/100.18 |
| 5,365,994 A | * | 11/1994 | Wheatley et al. ....... | 296/100.15 |
| 5,540,475 A | * | 7/1996 | Kersting et al. ........ | 296/100.16 |
| 5,788,315 A | * | 8/1998 | Tucker ................... | 296/100.15 |
| 5,984,400 A | * | 11/1999 | Miller et al. ........... | 296/100.18 |
| 6,257,306 B1 | * | 7/2001 | Weldy ................... | 296/100.18 |

* cited by examiner

Primary Examiner—Stephen T. Gordon
Assistant Examiner—Jason Morrow
(74) Attorney, Agent, or Firm—Patzik, Frank & Samotny Ltd.

(57) ABSTRACT

An apparatus for adjustably attaching a cover to an open-topped vehicle enclosure including a cover attachment member, a plurality of cover attachment clip members and a plurality of rail members attached to the top of a side wall of the enclosure by any suitable means. A cover attachment member affixed to a peripheral element of a cover is engageable with the cover attachment clip members, which are engageable with the rail members. The cover attachment member may be attached to the rail member in various different positions to accommodate variations in the cover dimensions.

12 Claims, 2 Drawing Sheets

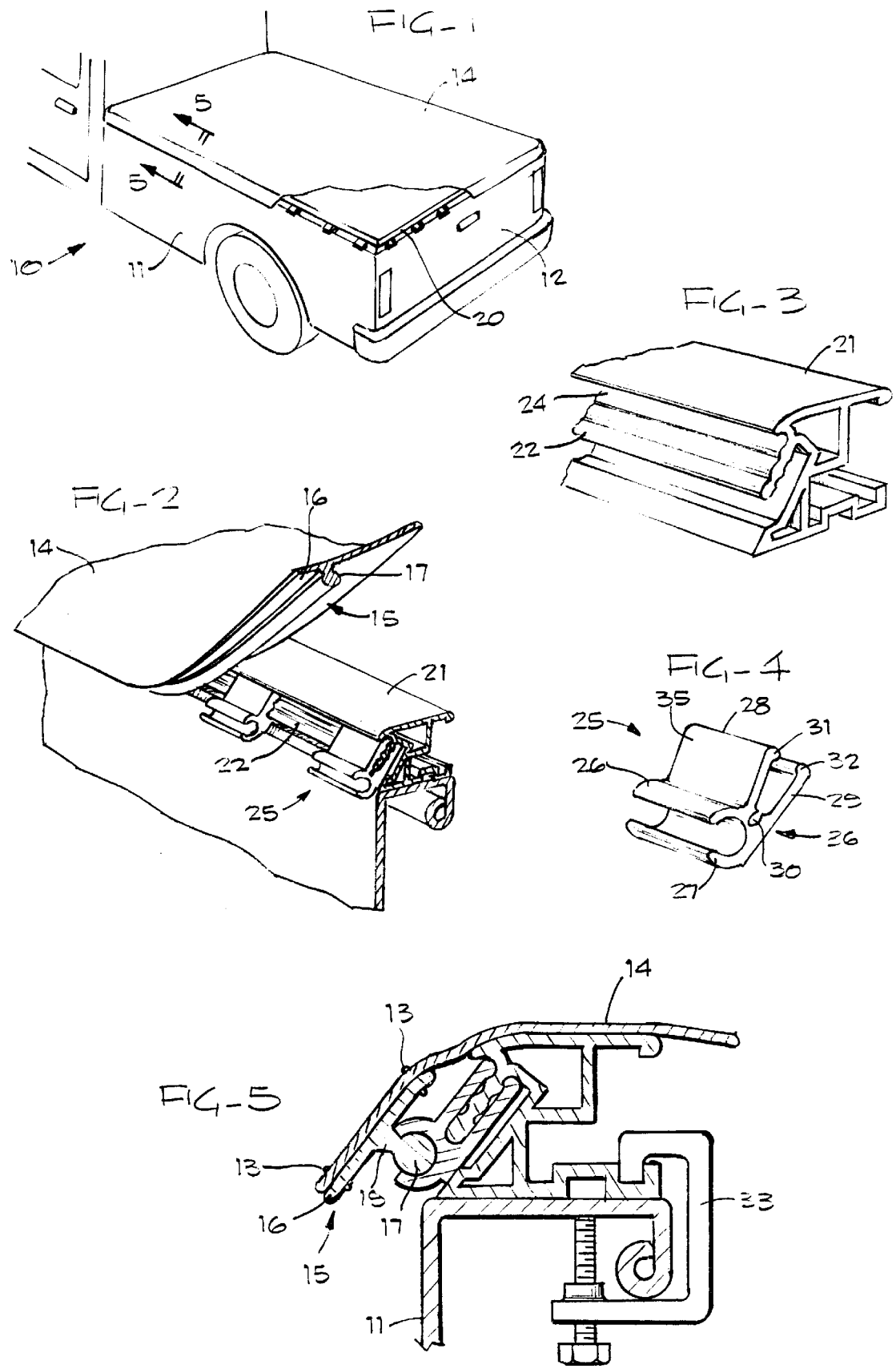

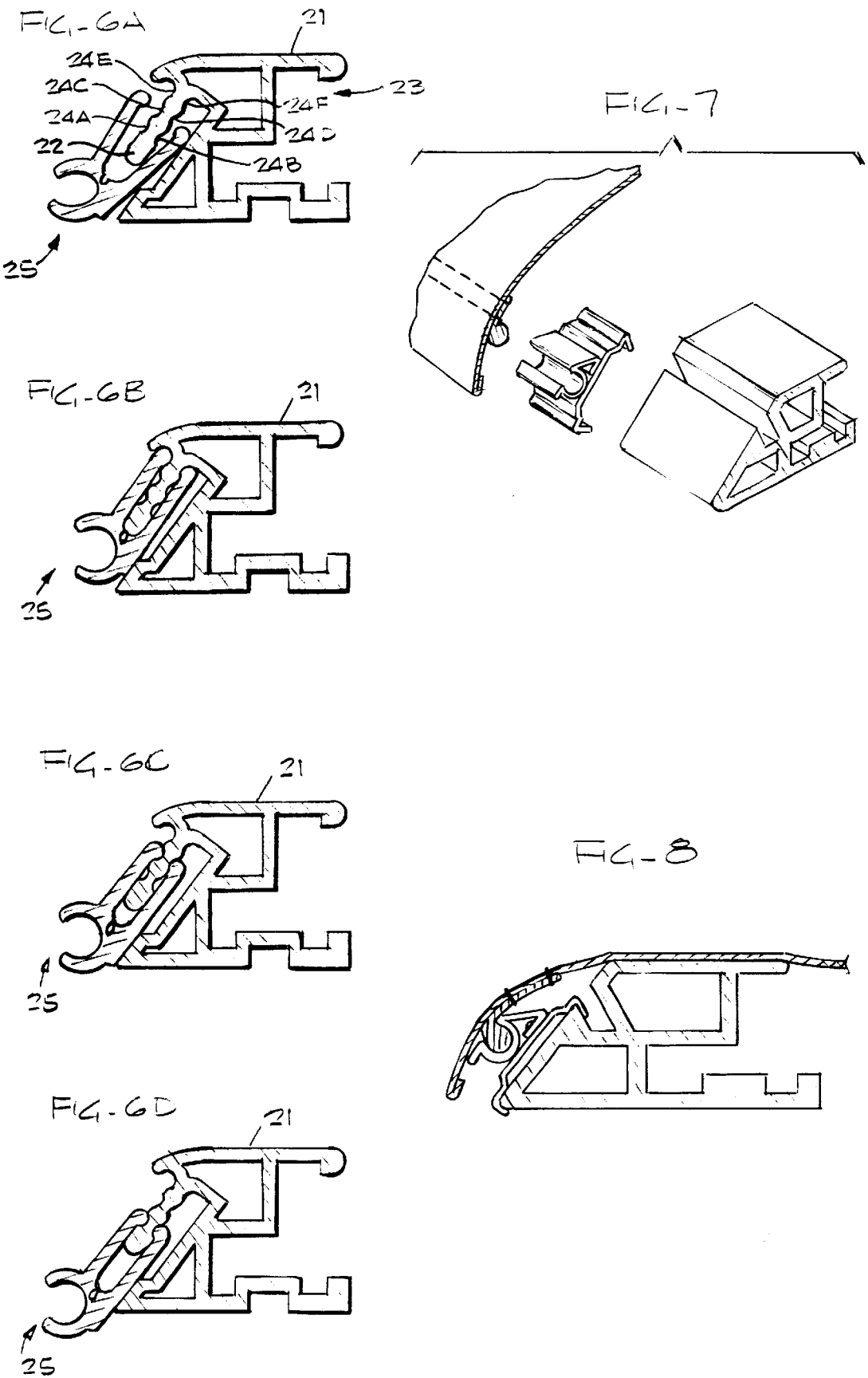

FASTENERS FOR TRUCK BED COVERS

This application is a divisional of U.S. application Ser. No. 09/181,792, filed Oct. 28, 1998, which is now abandoned.

BACKGROUND OF THE INVENTION

1. Field of the Invention

The present invention is directed to covers for the beds of pickup trucks and the like, and in particular to systems for attaching covers to the beds of such vehicles and similar stowage spaces. Such covers are also used on open bed trailers and on recreational vehicles such as boats.

2. Background Art

Vehicles, such as pickup trucks or open bed trailers, have cargo areas which are generally exposed to the elements. Thus, it is often desirable to provide a cover which will protect such areas when not in use, when in use in inclement weather, and/or from visual inspection and theft. In order to increase versatility, it is desirable to provide a cover which may be quickly removed when desired.

Such covers typically comprise an expanse of flexible covering material which has been treated for resistance to, or is inherently resistant to, the effects of outside elements. An inherent characteristic of the covering material typically used in such applications is the tendency to expand and contract as the cover material heats and cools, especially according to variations in ambient temperature. A further inherent characteristic is a relative lack of stretchability in certain directions. Cover dimension variations may also occur as the result of moisture and aging.

Based on these cover material characteristics, cover fit problems frequently arise as a result of seasonal variations in temperature. In warm or hot weather, the cover material's propensity to expand may cause the cover material to fit loosely in one or both the transverse and longitudinal directions. A loosely-fitting cover is likely to sag in the center and collect rainwater and debris. In cooler weather, the cover material may contract in one or both directions to the extent that it cannot be properly installed. Since such covers are typically designed and manufactured to fit a class of vehicles and are not custom made to fit a particular vehicle, cover fitment problems may also arise as a result of tolerances used in the manufacture of the enclosures to be covered.

It would therefore be desirable to provide an apparatus for attaching a removable cover to pickup truck beds, boats, open bed trailers, and the like, which is capable of accommodating changes in either or both of the cover's dimensions—while still functioning in a satisfactory manner. These and other objects of the invention will become apparent in light of the present specification, claims, and drawings.

SUMMARY OF THE INVENTION

The present invention is a cover apparatus for an open-topped vehicle enclosure having a plurality of side walls, each side wall having at least an outer wall and a top wall. The cover apparatus comprises at least one rail member having at least an outer side and a longitudinal axis, a cover member having at least one locking member affixed along the peripheral region of the cover, and means for adjustably affixing the at least one locking member of the cover member to the at least one rail member.

The at least one rail member is configured to be removably mounted on the top walls of the plurality of side walls of the enclosure. The at least one rail member is further configured to have a flange with a proximal end, a distal end, a transverse axis, and a longitudinal axis, the longitudinal axis of the flange being substantially parallel to the longitudinal axis of the at least one rail member. The proximal end of the flange is associated with the outer side of the at least one rail member, and the distal end of the flange is substantially free.

The adjustable affixation means comprises at least one clip member which is configured to be releasably and lockingly engageable to the flange at one or more positions along the flange's transverse axis so as to provide adjustability of the cover member along the flange's transverse axis. The clip member is configured to interlockingly engage with the at least one locking member so as to securely affix the cover member to the at least one clip member. The clip member is further configured to preclude undesired repositioning of the clip member relative to the flange while the locking member is engaged with the clip member.

In an embodiment of the invention, the at least one clip member is sufficiently resilient to retain its desired position on the flange when affixed to the flange. The at least one clip member is configured to be releasably and lockingly affixable to the flange at one or more positions along the flange's longitudinal axis so as to provide adjustability of the at least one clip member along the longitudinal axis of the rail member. The at least one clip member is further configured to be releasably and lockingly affixable to any one of a plurality of pre-selected positions along the transverse axis of the flange so as to adjust the degree of tightness of the cover member when attached to the at least one rail member.

In a preferred embodiment, the plurality of pre-selected positions is in the form of a plurality of substantially spaced-apart indentations. Alternatively, the plurality of preselected positions may be a plurality of grooves extending longitudinally along the flange.

The present invention is also directed towards a clip member for attaching a locking member of a cover member to a rail member, the clip member comprising rail gripping means for releasably, adjustably, and lockingly gripping the rail member; cover retention means for releasably and lockingly attaching the locking member of the cover member to the clip member; and release means for selectively attaching and detaching the gripping means to any of a plurality of pre-selected positions on the rail member. The rail member has at least a protruding flange, a longitudinal axis, and a transverse axis. The clip member is configured to prevent inadvertent release of the rail gripping means from the rail member when the locking member of the cover member is engaged with the cover retention means of the clip member.

In a preferred embodiment of the invention, the rail gripping means is comprised of two substantially rigid, substantially linear, and substantially parallel opposed legs having a proximal end and a distal end, the distal end of each leg being substantially free. The distal end of at least one of each leg terminates in a bump which is oriented so as to face the adjacent leg. The plurality of pre-selected positions on the rail member is comprised of a plurality of substantially spaced-apart indentations along the flange's transverse axis. The bump on the at least one of each leg is operably configured to securely and releasably engage the indentations along the flange's transverse axis.

In this embodiment of the invention, the proximal end of each leg may terminate at and be operably associated with hinge means, the hinge means allowing substantial separation of the distal ends of the legs. The hinge means may be biased so as to urge the distal ends of the legs towards contact with each other. Alternatively, each leg may be sufficiently resilient to allow for selective disengagement of the bump on the at least one of each leg from the rail member.

In an alternate embodiment of the invention, the rail gripping means is comprised of two substantially rigid, substantially linear, and substantially parallel opposed legs having a proximal end and a distal end, the distal end of each leg being substantially free. The distal end of at least one of each leg terminates in a tooth which is oriented so as to face the adjacent leg. The plurality of pre-selected positions on the rail member is comprised of a plurality of substantially spaced-apart grooves along the flange's transverse axis. The tooth on the at least one of each leg is operably configured to securely and releasably engage the grooves along the flange's transverse axis.

In this embodiment of the invention, the proximal end of each leg may terminate at and be operably associated with hinge means, the hinge means allowing substantial separation of the distal ends of the legs. The hinge means may be biased so as to urge the distal ends of the legs toward contact with each other. Alternatively, each leg may be sufficiently resilient to allow for selective disengagement of the tooth on the at least one of each leg from the rail member.

In a preferred embodiment of the invention, the cover retention means for attaching the locking member of the cover member is comprised of a female cover receiving member integral with the clip member and operably associated with the gripping means, a male locking member operably attached to the outer periphery of the cover member, and the male locking member being securely and releasably captured and retained by the female member. In this embodiment, the female cover receiving member comprises two substantially rigid, substantially arcuate, longitudinally opposed legs integral with the clip member. Each leg has a proximal end and a distal end with the proximal end of each leg terminating at and associated with hinge means so as to define an open-ended, substantially C-shaped structure allowing for secure receipt of the male member. In this embodiment, the male locking member is releasably and lockingly engageable with the female cover receiving member.

In a preferred embodinent of the invention, the release means comprises a hinge operably associated with the gripping means, the hinge being biased so as to urge said gripping means into an engaged condition with respect to said rail member. In this embodiment, the hinge may further be operably associated with the cover attachment means so as to lock the gripping means in an engaged condition with respect to the rail member when the locking member of the cover is engaged with the cover attachment means.

In a preferred embodiment of the invention, the clip member is comprised of a rigid, substantially linear front member; a rigid, substantially linear rear member substantially separate from and parallel to the front member; and a pivot member. The front member has two ends comprising a gripping leg and an attaching leg, and a mid-section. The rear member has two ends comprising a gripping leg and an attaching leg, and a mid-section. The pivot member is located between and is associated with the mid-sections of the front member and the rear member so as to permit substantial separation of the gripping legs.

The invention is further directed to a cover apparatus for an open-topped vehicle enclosure having a plurality of side walls, wherein each side wall has an outer wall and a top wall. The cover includes a rail member, a cover member and means for affixing the cover member to the rail member. The rail member is associated with the top wall of the side wall of the vehicle. The rail member includes a outer surface and an upper and lower edge. The cover member includes a locking member associated with a peripheral region of the cover. The affixing means comprises a clip member having two retention regions and a receiver member. The two retention regions are configured so as to snapingly engage each of the upper and lower edges of the rail member. The receiver member releasably receives the locking member.

In a preferred embodiment of the invention, the receiving member comprises a c-channel and the locking member comprises a bead configured for releasable receipt within the c-channel.

In another preferred embodiment of the invention, the clip member is substantially precluded from slidable movement along the longitudinal axis of the channel.

In yet another embodiment of the invention, the channel member is disposed at an angle relative to the top surface of the side wall of the vehicle.

BRIEF DESCRIPTION OF THE DRAWINGS

FIG. 1 is a perspective view of a pickup truck showing a cover in fragmented view in place on the truck bed, and also showing the system for mounting the cover, according to one embodiment of the invention;

FIG. 2 is a perspective view of the cover mounting system components;

FIG. 3 is a perspective view of a rail member;

FIG. 3A is a side elevation of a rail member and a clip member, in accordance with an alternative embodiment of the invention;

FIG. 3B is a side elevation of a rail member and a clip member, in accordance with an another alternative embodiment of the invention;

FIG. 3C is a side elevation of a rail member and a clip member, in accordance with an another alternative embodiment of the invention;

FIG. 4 is a perspective view of a cover mounting clip member according to the embodiment of FIGS. 1–3;

FIG. 5 is a side elevation of the cover attachment apparatus according to FIGS. 1–4, clamped to a pickup truck bed side wall;

FIG. 6A is a side elevation of the adjustable member of FIG. 4, in the process of being attached to a rail member;

FIG. 6B is a side elevation of the adjustable member of FIG. 6 in one stage of adjustment;

FIG. 6C is another side elevation of the adjustable member of FIG. 6 in another stage of adjustment;

FIG. 6D is still another side elevation of the adjustable member of FIG. 6 in a further stage of adjustment;

FIG. 7 is an exploded perspective view of the cover adjustment apparatus, in accordance with another alternative embodiment of the invention; and FIG. 8 is a side elevation of the adjustable member according to the embodiment of FIG. 7.

BEST MODE FOR CARRYING OUT THE INVENTION

While this invention is susceptible of embodiment in many different forms, there is shown in the drawings, and will be described herein in detail, a specific embodiment, with the understanding that the present disclosure is to be considered as an exemplification of the principles of the invention and is not intended to limit the invention to the embodiments illustrated.

In the drawings several embodiments are illustrated, in which elements which are similar in function or configuration are provided with like reference numerals.

FIG. 1 shows a pickup truck 10 having a cover 14 and the cover attachment or rail system, generally designated by the numeral 20. It will be understood that the cover attachment system(s) described herein can be used on all four edges of a tonneau cover. Alternatively, one edge, such as the cab rail edge of the cover, can be substantially permanently affixed to the cab rail or otherwise affixed to the cab rail, using other suitable fastening techniques. Truck 10 includes a truck bed comprised of a plurality of side walls 11 and a tailgate 12. Truck bed side walls 11 and tailgate 12 define a four-sided, open-topped enclosure. Each of the side walls 11 and tailgate 12 are comprised of at least an outer wall and a top wall. Rail system 20 is installed proximate the top walls of truck bed side walls 11 along the enclosure's periphery. Rail system 20 spans the top of tailgate 12 and is attached to truck bed side walls 11 using any suitable means, such as clamps, screws, nuts and bolts, or other means including hook and loop fasteners and adhesive. Rail system 20 is not affixed to tailgate 12, and in turn, tailgate 12 is repositionable without interference from rail system 20. Cover 14 may be removably attached to rail system 20 and comprises a sheet of suitable durable and water-repellant material, such as leather, fabric, vinyl, heavy plastic, or the like. Moreover, cover 14 may be comprised of a single piece of material or a number of separate panels which may be attached together.

FIG. 2 provides a perspective view of cover 14 attached to rail member 21. Cover locking member 15 is affixed to cover 14 by means of stitching 13 (FIG. 5), as well as by staples, thermal bonding, or other suitable means. As shown in FIGS. 2 and 5, cover locking member 15 is comprised of an elongated, generally flat strip 16 with an integrally attached elongated bead 17. Bead 17 is offset from strip 16 by a thin web 19. While other structures and materials are contemplated, cover locking member 15 comprises a monolithic extrusion of a resilient material, such as a resilient plastic. In use, bead 17 engages with clip members 25, which, in turn, engage with flange 22 on rail member 21. In the embodiment shown in FIGS. 2 and 5, rail member 21 is attached to side wall 11 using clamp 33.

Rail member 21 is shown in FIGS. 3, 5 and 6A–6D as including longitudinally extending flange 22. Flange 22 is generally oblong in cross-section and points downwardly and outwardly from truck bed side wall 11 when rail member 21 is installed atop truck bed side wall 11 in the manner shown in FIGS. 1, 2 and 5. As seen in FIG. 6A, a plurality of longitudinally extending indents 24A–24F is located in pairs on opposite sides of flange 22. Indents 24A–24F run parallel to flange 22 along its length, and form an alternating series of ridges and grooves on opposing sides of flange 22. As explained below, and as shown in FIGS. 6A–D, in use, opposing pairs of indents 24A–24F may be releasably engaged by bumps 31 and 32 on clip member 25. Although three sets of indents are shown in the drawings and described herein, it will be understood that greater or fewer pairs of indents may be provided.

FIG. 4 shows a perspective view of clip member 25. Front side 35 of clip member 25 includes straight leg 28 and arcuate leg 26 and is preferably made of a substantially rigid material, such as metal, hard plastic or the like. Rear side 36 of clip member 25 likewise includes straight leg 29 and arcuate leg 27, and is preferably made of a substantially rigid material such as metal or hard plastic or the like. Front side 35 of clip member 25 is connected to rear side 36 of clip member 25 at hinge section 30.

In particular, each clip member 25 may comprise a monolithic coextrusion plastic materials. Front side 35, including legs 26 and 27, and rear side 36, including legs 28 and 29, may be made of a material which is sufficiently rigid to prevent deflection under typical operating and use conditions, as discussed herein. Hinge section 30 may be made of a material which is sufficiently resilient to allow deflection of legs 28 and 29 relative to one another when a pinching force is applied to legs 26 and 27, and to allow the legs of the clip member to return to their respective original positions when the force is released.

In an alternative embodiment of the invention (not shown), the clip members may be fabricated from two separate, substantially rigid, components forming the legs, with a pivot element (like a pivot pin) pivotably connecting the two substantially rigid components. A spring element could be provided to prompt the legs of the clip member intended to grasp the rail flange toward one another.

Viewed in cross section, such as in FIGS. 6A–D, clip member 25 includes a C-shaped element connected to a U-shaped element. Arcuate legs 26 and 27 define the C-shaped element, while straight legs 28 and 29 define the U-shaped element. The lines that bisect the C-shaped element and the U-shaped element are offset from each other at an included angle which is less than 180 degrees and greater than 90 degrees. The C-shaped element and U-shaped element are attached at hinge section 30. Legs 28 and 29 terminate in bumps 31 and 32 which extend inwardly, toward the "centerline" of the U-shaped element. The outboard surfaces of legs 28 and 29 are substantially straight, as seen in FIGS. 6A–D.

In an alternative embodiment of the invention, as shown in FIG. 3A, flange 22' includes indentations 24B', 24D', and 24F' on one side of the flange only. Conversely, in another such embodiment (not shown) the indentations may be positioned on the opposite side of the flange. When indentations are provided on only one side of the flange, a bump, such as bump 32', may be provided on only one of the legs of the clip member.

In another alternative embodiment, shown in FIG. 3B, a plurality of longitudinally extending notches 24A"–24F" are located in pairs on opposite sides of flange 22", running parallel to flange 22" along its length. Opposing pairs of notches 24A"–24F" may be releasably engaged by wedge-shaped teeth 31" and 32" on clip member 25". While three sets of notches are shown in FIG. 3B, greater or fewer than three sets of notches may be provided. In a still further embodiment, notches may be provided on only one side of the flange, in which case, the corresponding clip member may have a tooth on a corresponding one leg as well.

In still another preferred embodiment of the invention, shown in FIG. 3C, more than one bump or tooth may be provided on each of legs 28'" and 29'". For example, as illustrated in FIG. 3C, three bumps 31'" and 32'" are provided on legs 28'" and 29'", respectively. This provides additional resistance to undesired and/or inadvertent movement.

FIG. 5 shows clip member 25 (of the embodiment of FIGS. 1–4) engaged with flange 22 of rail member 21 and bead 17 engaged in the C-shaped element of clip members 25. In this configuration, bumps 31 and 32 are securely engaged with indents 24. Bead 17, when engaged with the C-shaped elements of clip members 25, prevents the pivoting of legs 26 and 28, relative to legs 27 and 29, on each clip member 25, so that clip members 25 cannot be readily removed from flange 22. Such an orientation is likewise shown in FIG. 6B. In a preferred embodiment of the invention, rail member 21 includes assembly channel 23, which is configured to receive clamping apparatus 33, for clamping rail member 21 to truck bed side wall 11.

FIGS. 6A–D illustrate the method of positioning a clip member 25 on flange 22. With bead 17 removed from the C-shaped element of clip members 25, a pinching force may be applied to legs 26 and 27, causing legs 28 and 29 to move away from one another. With legs 28 and 29 separated, bumps 31 and 32 disengage from their respective indents 24A–24F. While the pinching force is applied to legs 26 and 27, thus keeping legs 28 and 29 spread apart, clip member 25 may be moved along flange 22 to a position wherein bumps 31 and 32 can engage with the desired pair of indents 24A–24F upon release of legs 26 and 27. In a pinched orientation, clip members 25 may also easily be moved longitudinally along the length of flange 22.

As shown in FIG. 6, there are three pairs of indents 24A–24F on flange 22, although as explained, greater or fewer pairs of indents may be provided. The tightness of the cover 14 will depend upon which indents are engaged by the clip members 25. In particular, FIG. 6B shows bumps 31 and 32 engaged with indents 24E and 24F, placing clip member 25, so that loose orientation. Clip members 25 may be installed in this position to allow for a loose cover fit, or to accommodate contraction of the cover, such as may occur during cold weather. FIG. 6C shows bumps 31 and 32 engaged with indents 24C and 24D, placing clip member 25 which, in turn, would tighten the cover. FIG. 6D shows bumps 31 and 32 engaged with indents 24A and 24B. Clip members 25 may be installed in this setting to create a tighter fit or to accommodate expansion of the cover material, such as may be caused by hot sunlight, etc. In sum, clip members 25 may be manipulated as shown in FIGS. 6A–D so as to be installed in various transverse locations along flange 22, to, in turn, effectively vary the installed tautness of cover 14. As shown in the drawings, the farther inwardly (i.e., toward the rail) the clip member(s) is/are inserted and engaged, the looser the cover placement will be. To the contrary, moving the clip member(s) outward will resulting in a tighter fit of the cover.

After the clip members are positioned as desired on the rail member(s), bead 17 is snapped into the C-shaped portions of the clip members (defined by respective legs 26 and 27). Bead 17 will prevent the articulation of the clip members, so that they cannot be readily pulled or dislodged from rails 21.

An alternate embodiment is shown in FIGS. 7 and 8. In such an embodiment, clip member 125 includes receiving member 127 and attaching members 151 which attach to rail 121. In particular, attaching members 151 are snapped into position, retention regions 160 and 162 snap into position to straddle rail 121. As shown, the receiving member includes a c-channel which is integrally associated with the attaching members 151.

In operation of this embodiment, a plurality of attaching members are attached to rail 151. In particular, each attaching member is pressed against rail 21, until retention regions 160, 162 snap into position to straddle the upper and lower ends of rail 121. When snapped into position, the attaching member is substantially precluded from slidable movement relative to the rail 121. Once snapped into position, bead 117 of the cover 114 is snapped into c-channel 127 for releasable receipt thereof.

In an alternate embodiment (not shown), the retention regions of the rail may be configured so as to permit slidable movement of the attaching member and the integral c-channel longitudinally along the rail.

The foregoing description and drawings merely explain and illustrate the invention. The invention is not limited thereto except to the extent that the appended claims are so limited, as those skilled in the art who have the disclosure before them will be able to make modifications and variations therein without departing from the scope of the invention.

What is claimed is:

1. A cover apparatus for an open-topped vehicle enclosure having a plurality of side walls, each side wall having at least an outer wall and a top wall, the cover apparatus comprising:
at least one rail member, associated with the top wall of the side wall of the vehicle, and having a longitudinal axis and a flange, wherein the flange extends outward from the vehicle;
a cover member having at least one locking member associated with a peripheral region of the cover member; and
means for affixing the at least one locking member to the at least one rail member, the affixing means comprising a clip member having a pair of legs for snapingly engaging the flange of the rail member, and a receiver member for releasably receiving the at least one locking member, wherein the receiving member comprises a c-channel.

2. The apparatus according to claim 1 where the at least one locking member comprises a bead affixed to the peripheral region of the cover member and configured for releasable receipt within the c-channel.

3. The apparatus according to claim 1 wherein the clip member is substantially precluded from slidable movement along the longitudinal axis of the rail member.

4. The apparatus of claim 1 wherein the c-channel is disposed at an angle relative to the top wall of the vehicle.

5. The apparatus of claim 1 wherein the flange includes a longitudinal axis, and wherein the longitudinal axis of the flange is substantially parallel to the longitudinal axis of the rail member.

6. A cover apparatus for an open-topped vehicle enclosure having a plurality of side walls, each side wall having at least an outer wall and a top wall, the cover apparatus comprising:
at least one rail member, associated with the top wall of the side wall of the vehicle, and having a longitudinal axis and a flange, wherein the flange extends outward from the vehicle,
a cover member having at least one locking member associated with a peripheral region of the cover member; and
means for affixing the at least one locking member to the at least one rail member, the affixing means comprising a clip member having a pair of legs for snapingly engaging the flange of the rail member, and a receiver member for releasably receiving the at least one locking member, wherein the clip member is substantially precluded from slidable movement along the longitudinal axis of the rail member;
wherein the flange comprises a plurality of indents and the pair of legs of the clip member comprise a plurality of bumps, wherein the plurality of indents are releasably engaged by the bumps to substantially preclude movement of the clip member along the longitudinal axis of the rail member.

7. The apparatus of claim 6 wherein the clip member comprises three indents and each of the pair of legs comprises three bumps.

8. A cover apparatus for an open-topped vehicle enclosure having a plurality of side walls, each side wall having at least an outer wall and a top wall, the cover apparatus comprising:

at least one rail member associated with the top wall of the side wall of the vehicle, wherein the at least one rail member comprises a longitudinal axis and a flange having a longitudinal axis and a plurality of indents, wherein the flange extends outward from the vehicle such that the longitudinal axis of the flange is substantially parallel to the longitudinal axis of the at least one rail member;

a cover member having at least one locking member associated with a peripheral region of the cover member; and a clip member comprising a receiver member for releasably receiving the at least one locking member and means for releasably and lockingly affixing the clip member to the at least one rail member, wherein the affixing means comprises a pair of legs for snapingly engaging the flange, wherein the pair of legs of the clip member comprise a plurality of bumps, and wherein the plurality of indents are releasably engaged by the bumps to substantially preclude movement of the clip member along the longitudinal axis of the rail member.

9. The apparatus of claim 8 wherein the clip member comprises three indents and each of the pair of legs comprises three bumps.

10. A cover apparatus for an open-topped vehicle enclosure having a plurality of side walls, each side wall having at least an outer wall and a top wall, the cover apparatus comprising:

at least one rail member associated with the top wall of the side wall of the vehicle, wherein the at least one rail member comprises a longitudinal axis and a flange having a longitudinal axis, wherein the flange extends outward from the vehicle such that the longitudinal axis of the flange is substantially parallel to the longitudinal axis of the at least one rail member;

a cover member having at least one locking member associated with a peripheral region of the cover member; and a clip member comprising a receiver member for releasably receiving the at least one locking member and means for releasably and lockingly affixing the clip member to the at least one rail member, wherein the receiving member comprises a c-channel and the at least one locking member comprises a bead configured for releasable receipt within the c-channel.

11. The apparatus of claim 10 wherein the c-channel is disposed at an angle relative to the top wall of the vehicle.

12. The apparatus of claim 8 wherein the locking member is affixed to the peripheral region of the cover member.

* * * * *

UNITED STATES PATENT AND TRADEMARK OFFICE
CERTIFICATE OF CORRECTION

PATENT NO.    : 6,669,264 B1
DATED         : December 30, 2003
INVENTOR(S)   : W. David Tucker It is certified that error appears in the above-identified patent and that said Letters Patent is hereby corrected as shown below:

Column 9,
Line 5, replace "clip member" with -- flange --
Line 6, after the word "three" insert the words -- sets of --
Line 6, delete "each of"
Line 7, replace "three" with -- two --

Column 10,
Line 1, replace "clip member" with -- flange --
Line 2, after the word "three" insert the words -- sets of --
Line 2, delete "each of"
Line 3, replace "three" with -- two --

Signed and Sealed this

Twenty-fourth Day of August, 2004

JON W. DUDAS
*Director of the United States Patent and Trademark Office*